United States Patent
Chuang et al.

(10) Patent No.: US 8,115,846 B2
(45) Date of Patent: Feb. 14, 2012

(54) ACTIVE PIXEL SENSOR CIRCUIT

(75) Inventors: Ming-Hung Chuang, Hsinchu (TW); An-Thung Cho, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 690 days.

(21) Appl. No.: 12/252,039

(22) Filed: Oct. 15, 2008

(65) Prior Publication Data

US 2010/0091162 A1 Apr. 15, 2010

(51) Int. Cl.
*H04N 5/335* (2006.01)
*H04N 5/217* (2006.01)

(52) U.S. Cl. .......................... 348/308; 348/241

(58) Field of Classification Search .................. 348/294, 348/302, 308, 296, 243, 241, 222.1
See application file for complete search history.

(56) References Cited

U.S. PATENT DOCUMENTS

| 6,097,022 | A | 8/2000 | Merrill et al. .............. 250/208.1 |
| 7,688,370 | B2 * | 3/2010 | Hur et al. ...................... 348/294 |
| 7,755,018 | B2 * | 7/2010 | Barna et al. ................ 250/208.1 |
| 7,786,986 | B2 | 8/2010 | Akimoto ........................ 345/207 |
| 7,948,533 | B2 * | 5/2011 | Koseki ............................ 348/243 |
| 2004/0179391 | A1 | 9/2004 | Bhattacharyya .............. 257/292 |
| 2007/0181922 | A1 | 8/2007 | Huo et al. | |

FOREIGN PATENT DOCUMENTS

| EP | 0490683 A2 | 6/1992 |
| GB | 2439098 A | 12/2007 |
| JP | 2005300630 A | 10/2005 |
| JP | 2007011233 A | 1/2007 |

* cited by examiner

*Primary Examiner* — Mohammed Hasan
(74) *Attorney, Agent, or Firm* — Morris Manning & Martin LLP; Tim Tingkang Xia, Esq.

(57) ABSTRACT

The present invention relates to an active pixel sensor circuit and a method of operating same. In one embodiment, the active pixel sensor circuit includes a reset transistor having a gate, a source and a drain, a silicon rich oxide (SRO) photosensor having an anode and a cathode electrically coupled to the source of the reset transistor, and a readout transistor having a gate electrically coupled to the cathode of the SRO photosensor, a source and a drain.

16 Claims, 11 Drawing Sheets

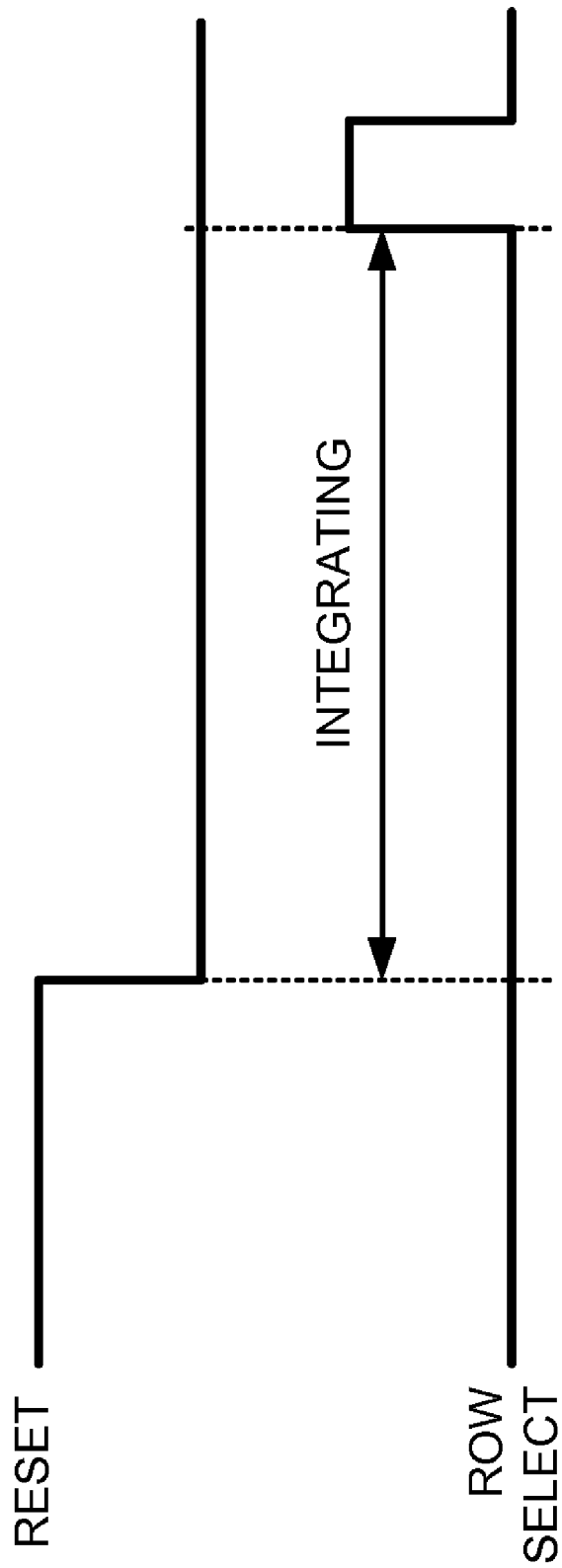

ACTIVE PIXEL SENSOR CIRCUIT

FIELD OF THE INVENTION

The present invention relates to an active pixel sensor, and more particularly to an active pixel sensor circuit that utilizes a two-transistor design to improve aperture ratio and sensitivity.

BACKGROUND OF THE INVENTION

Generally, CMOS active pixel sensors utilize amplifiers built in each pixel to amplify photovoltaic signals generated by photosensors in response to illumination of light, which can be readout selectively according to an X-Y address of each pixel. For such CMOS active pixel sensors, the photovoltaic signals are amplified by the built-in amplifiers before being transmitted to external control circuits, thereby eliminating noises associated with transmitting passes of the signals.

It is known that the sensitivity of an active pixel sensor is determined by at least three factors. The first factor is related to the area in the active pixel sensor available for converting photons to electrons. An increase in the area leads to an increase in the amount of charges generated. A second factor is related to the capacitance for the integration of the charges sensed by the active pixel sensor. Theoretically, a voltage on a capacitor for a given amount of charges is inversely proportional to the capacitance of the capacitor. Accordingly, when the capacitance increases, the voltage decreases for the same amount of charges. A third factor is the charge-to-voltage gain of the readout amplifier. In a display with built-in pixel sensors, a source follower is typically used as a charge-to-voltage amplifier. However, the gain is substantially equal to one, in practice the gain is less than one due to characteristic of the transistors.

FIG. 10 illustrates a conventional CMOS active pixel sensor 10 that has three N-channel MOS transistors 1, 4 and 5. In this active pixel sensor 10, a photodiode 2 employed as a photosensor has a anode connected to the ground, and a cathode connected to both the source of the reset transistor 1 and the gate of the readout transistor 4. An integral capacitor 3 is connected between the anode and cathode of the photodiode 2. The gate of the reset transistor 1 is connected to a reset line. Both the drain of the reset transistor 1 and the drain of the readout transistor 4 are connected to a supply voltage, $V_{DD}$. The source of the readout transistor 4 is connected to the drain of the row select transistor 5. The gate and source of the transistor 5 are connected to a row select line and a column output line, respectively. One end of the column output line is connected to a terminal of a current source 6, whose other terminal is connected to the ground.

A timing diagram corresponding to the operation of active pixel sensor 10 is depicted in FIG. 11. The active pixel sensor 10 is first reset by a RESET signal, during a reset stage, which turns on the reset transistor 1 to place the supply voltage $V_{DD}$ on the cathode of the photodiode 2. An integration stage begins when the RESET signal makes a transition from HIGH to LOW where photo-generated electrons are collected on the photodiode 2 to reduce the voltage on the cathode of the photodiode 2 from the value $V_{DD}$ placed there during the reset stage. When a ROW SELECT signal transits from LOW to HIGH, the active pixel sensor 10 starts a readout status. During the readout status, the ROW SELECT signal is asserted to turn on the select transistor 5 to place the voltage at the source of the readout transistor 4 on the column output line for detection. The voltage on the gate of the readout transistor 4 formed by the charge accumulated on the cathode of the photodiode 2 will be followed by the source of the readout transistor 4.

For such an active pixel sensor 10, its sensitivity can be improved by increasing the size of the photodiode 2 and/or the readout transistor 4. However, simply increasing the size of the photodiode 2 and/or the readout transistor 4 will reduce the aperture ratio and the light transmittance of cells of a display. For a fixed amount of brightness of the display, the brightness of the backlight illuminating the display must be increased, thereby increasing the consumption of power of the display.

Therefore, a heretofore unaddressed need exists in the art to address the aforementioned deficiencies and inadequacies.

SUMMARY OF THE INVENTION

The present invention, in one aspect, relates to an active pixel sensor circuit. In one embodiment, the active pixel sensor circuit includes a reset line for providing a reset signal, RESET, a row select line for providing a row select signal, ROW SELECT, a first supply voltage line for providing a first supply voltage, $V_{REF}$, a second supply voltage line for providing a second supply voltage, $V_{DD}$ and a column readout line for outputting a photovoltaic signal.

The active pixel sensor circuit also includes a reset transistor having a gate electrically coupled to the reset line, a source and a drain electrically coupled to the first supply voltage line, a photodiode having an anode electrically coupled to the row select line and a cathode electrically coupled to the source of the reset transistor, an integral capacitor having a first terminal electrically coupled to the row select line and a second terminal electrically coupled to a node, N1, that is electrically coupled to the source of the reset transistor; and a readout transistor having a gate electrically coupled to the node N1, a source electrically coupled to the column readout line at a node, N2, and a drain electrically coupled to the second supply voltage line.

In one embodiment, the active pixel sensor circuit includes a bias current source having a first terminal configured to receive the first supply voltage $V_{REF}$ and a second terminal electrically coupled to the column readout line.

In another embodiment, the active pixel sensor circuit includes an N-channel MOS transistor having a gate configured to receive a control signal, Vb, a source configured to receive the first supply voltage $V_{REF}$ and a drain electrically coupled to the column readout line.

In yet another embodiment, the active pixel sensor circuit includes an N-channel MOS transistor having a gate configured to receive a control signal, RESET, a source configured to receive the first supply voltage $V_{REF}$ and a drain electrically coupled to the column readout line, and a capacitor having a first terminal and a second terminal electrically coupled to the source and the drain of the N-channel MOS transistor, respectively.

In one embodiment, each of the reset transistor and the readout transistor is an N-channel MOS thin film transistor. Each of the reset signal RESET and the row select signal ROW SELECT is configured to have a pulse with a low voltage and a high voltage, and the pulse of the row select signal ROW SELECT is shifted from the pulse of the reset signal RESET by a time period of T.

In another aspect, the present invention relates to an active pixel sensor circuit. In one embodiment, the active pixel sensor circuit has a reset transistor having a gate, a source and a drain, a photodiode having an anode and a cathode electrically coupled to the source of the reset transistor, an integral capacitor having a first terminal and a second terminal electrically coupled to a node, N1, that is electrically coupled to the source of the reset transistor, and a readout transistor having a gate electrically coupled to the node N1, a source, and a drain.

Furthermore, the active pixel sensor circuit has a reset line electrically coupled to the gate of the reset transistor for providing a reset signal, RESET, a row select line electrically coupled to both the anode of the photodiode and the first terminal of the integral capacitor for providing a row select signal, ROW SELECT, a first supply voltage line electrically coupled to the drain of the reset transistor for providing a first supply voltage, $V_{REF}$, a second supply voltage line electrically coupled to the drain of the readout transistor for providing a second supply voltage, $V_{DD}$, and a column readout line electrically coupled to the source of the readout transistor for outputting a photovoltaic signal generated by the photodiode in response to illumination of light.

In one embodiment, each of the reset signal RESET and the row select signal ROW SELECT is configured to have a pulse with a low voltage and a high voltage, and the pulse of the row select signal ROW SELECT is shifted from the pulse of the reset signal RESET by a time period of T.

In yet another aspect, the present invention relates to a method of operating an active pixel sensor circuit. The active pixel sensor circuit includes a reset transistor having a gate, a source and a drain, a photodiode having an anode and a cathode electrically coupled to the source of the reset transistor, an integral capacitor having a first terminal and a second terminal electrically coupled to the anode of the photodiode, and a readout transistor having a gate electrically coupled to the second terminal of the integral capacitor, a source, and a drain.

In one embodiment, the method includes the steps of apply a first supply voltage, $V_{REF}$, and a second supply voltage, $V_{DD}$, to the drain of the reset transistor and the drain of the readout transistor, respectively, and applying a reset signal, RESET, and a row select signal, ROW SELECT, to the gate of the reset transistor and the anode of the photodiode, respectively, wherein each of the reset signal RESET and the row select signal ROW SELECT is configured to have a pulse with a low voltage and a high voltage, and the pulse of the row select signal ROW SELECT is shifted from the pulse of the reset signal RESET by a time period of T. The method also includes the step of reading out a signal from the source of the readout transistor during a readout period, where the signal is corresponding to the photo-charges generated by the photodiode in response to illumination of light. The readout period is corresponding to a time period in which the row select signal ROW SELECT is in the high voltage.

In a further aspect, the present invention relates to an active pixel sensor circuit. In one embodiment, the active pixel sensor circuit includes a reset transistor having a gate, a source and a drain, a silicon rich oxide (SRO) photosensor having an anode and a cathode electrically coupled to the source of the reset transistor, and a readout transistor having a gate electrically coupled to the cathode of the SRO photosensor, a source and a drain.

Additionally, the active pixel sensor circuit also includes a reset line electrically coupled to the gate of the reset transistor for providing a reset signal, RESET, a row select line electrically coupled to the anode of the SRO photosensor for providing a row select signal, ROW SELECT, a first supply voltage line electrically coupled to the drain of the reset transistor for providing a first supply voltage, $V_{REF}$, a second supply voltage line electrically coupled to the drain of the readout transistor for providing a second supply voltage, $V_{DD}$, and a column readout line electrically coupled to the source of the readout transistor for outputting a photovoltaic signal generated by the SRO photosensor in response to illumination of light. In one embodiment, each of the reset signal RESET and the row select signal ROW SELECT is configured to have a pulse with a low voltage and a high voltage, and the pulse of the row select signal ROW SELECT is shifted from the pulse of the reset signal RESET by a time period of T.

In one embodiment, the active pixel sensor circuit includes a bias current source having a first terminal configured to receive the first supply voltage $V_{REF}$ and a second terminal electrically coupled to the column readout line.

In another embodiment, the active pixel sensor circuit includes an N-channel MOS transistor having a gate configured to receive a control signal, Vb, a source configured to receive the first supply voltage $V_{REF}$ and a drain electrically coupled to the column readout line.

In yet another embodiment, the active pixel sensor circuit includes an N-channel MOS transistor having a gate configured to receive a control signal, RESET2, a source configured to receive the first supply voltage $V_{REF}$ and a drain electrically coupled to the column readout line, and a capacitor having a first terminal and a second terminal electrically coupled to the source and the drain of the N-channel MOS transistor, respectively.

In yet a further embodiment, the present invention relates to a method of operating an active pixel sensor circuit. The active pixel sensor circuit has a reset transistor having a gate, a source and a drain, an SRO photosensor having an anode and a cathode electrically coupled to the source of the reset transistor, and a readout transistor having a gate electrically coupled to the cathode of the SRO photosensor, a source and a drain.

In one embodiment, the method includes the steps of apply a first supply voltage, $V_{REF}$, and a second supply voltage, $V_{DD}$, to the drain of the reset transistor and the drain of the readout transistor, respectively, applying a reset signal, RESET, and a row select signal, ROW SELECT, to the gate of the reset transistor and the anode of the SRO photosensor, respectively, wherein each of the reset signal RESET and the row select signal ROW SELECT is configured to have a pulse with a low voltage and a high voltage, and the pulse of the row select signal ROW SELECT is shifted from the pulse of the reset signal RESET by a time period of T; and reading out a signal from the source of the readout transistor during a readout period. The signal is corresponding to the photo-charges generated by the SRO photosensor in response to illumination of light. The readout period is corresponding to a time period in which the row select signal ROW SELECT is in the high voltage.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 11 shows a timing diagram corresponding to the operation of the conventionally active pixel sensor circuit shown in FIG. 10.

DETAILED DESCRIPTION OF THE INVENTION

Figure 1:
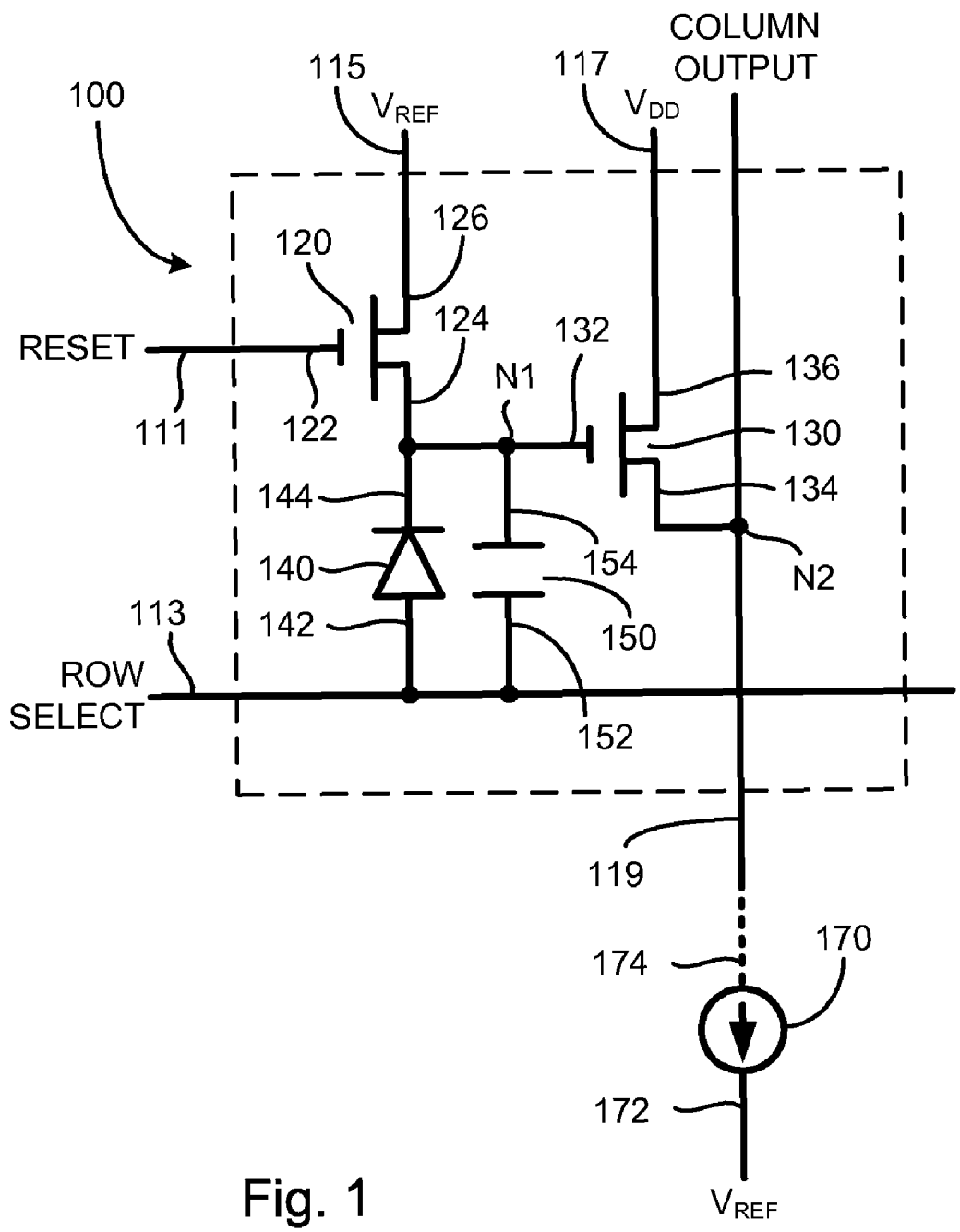
FIG. 1 shows an active pixel sensor circuit according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present invention in conjunction with the accompanying drawings in FIGS. 1-9. In accordance with the purposes of this invention, as embodied and broadly described herein, this invention, in one aspect, relates to an active pixel sensor circuit and a method of operating same.

FIG. 1 shows schematically an active pixel sensor circuit 100 according to one embodiment of the present invention. In this embodiment, the active pixel sensor circuit 100 includes a reset line 111 for providing a reset signal, RESET, a row select line 113 for providing a row select signal, ROW SELECT, a first supply voltage line 115 for providing a first supply voltage, $V_{REF}$, a second supply voltage line 117 for providing a second supply voltage, $V_{DD}$, and a column readout line 119 for outputting a photovoltaic signal.

The active pixel sensor circuit 100 also includes a reset transistor 120 having a gate 122 electrically coupled to the reset line 111, a source 124 and a drain 126 electrically coupled to the first supply voltage line 115, a photodiode 140 having an anode 142 electrically coupled to the row select line 113 and a cathode electrically coupled to the source 124 of the reset transistor 120, an integral capacitor 150 having a first terminal 152 electrically coupled to the row select line 113 and a second terminal 154 electrically coupled to a node, N1, that is electrically coupled to the source 124 of the reset transistor 120, and a readout transistor 130 having a gate 132 electrically coupled to the node N1, a source 134 electrically coupled to the column readout line 119 at a node, N2, and a drain 136 electrically coupled to the second supply voltage line 117. The photodiode 140 is adapted for generating charges (photovoltaic signal) in response to the illumination of light. Each of the reset transistor and the readout transistor is an N-channel MOS thin film transistor. Other types of transistors can also be utilized to practice the present invention.

Additionally, the active pixel sensor circuit 100 includes a bias current source 170 having a first terminal 172 configured to receive the first supply voltage $V_{REF}$ and a second terminal 174 electrically coupled to the column readout line 119. The readout transistor 130 and the current source 170 constitutes a source follower that is adapted for amplifying the charges (photovoltaic signal) generated by the photodiode 140 in response to the illumination of light. The amplified photovoltaic signal is readout from the column readout line 119 through the node N2, which is extended to an external circuit.

The operation of the active pixel sensor circuit 100 includes applying a first supply voltage, $V_{REF}$, and a second supply voltage, $V_{DD}$, to the drain 126 of the reset transistor 120 and the drain 136 of the readout transistor 130, respectively, and applying a reset signal, RESET, and a row select signal, ROW SELECT, to the gate 122 of the reset transistor 120 and the anode 142 of the photodiode 140, respectively, and reading out a signal from the source 134 of the readout transistor 130 during a readout period. The signal is corresponding to the charges generated by the photodiode in response to illumination of light.

Figure 2:
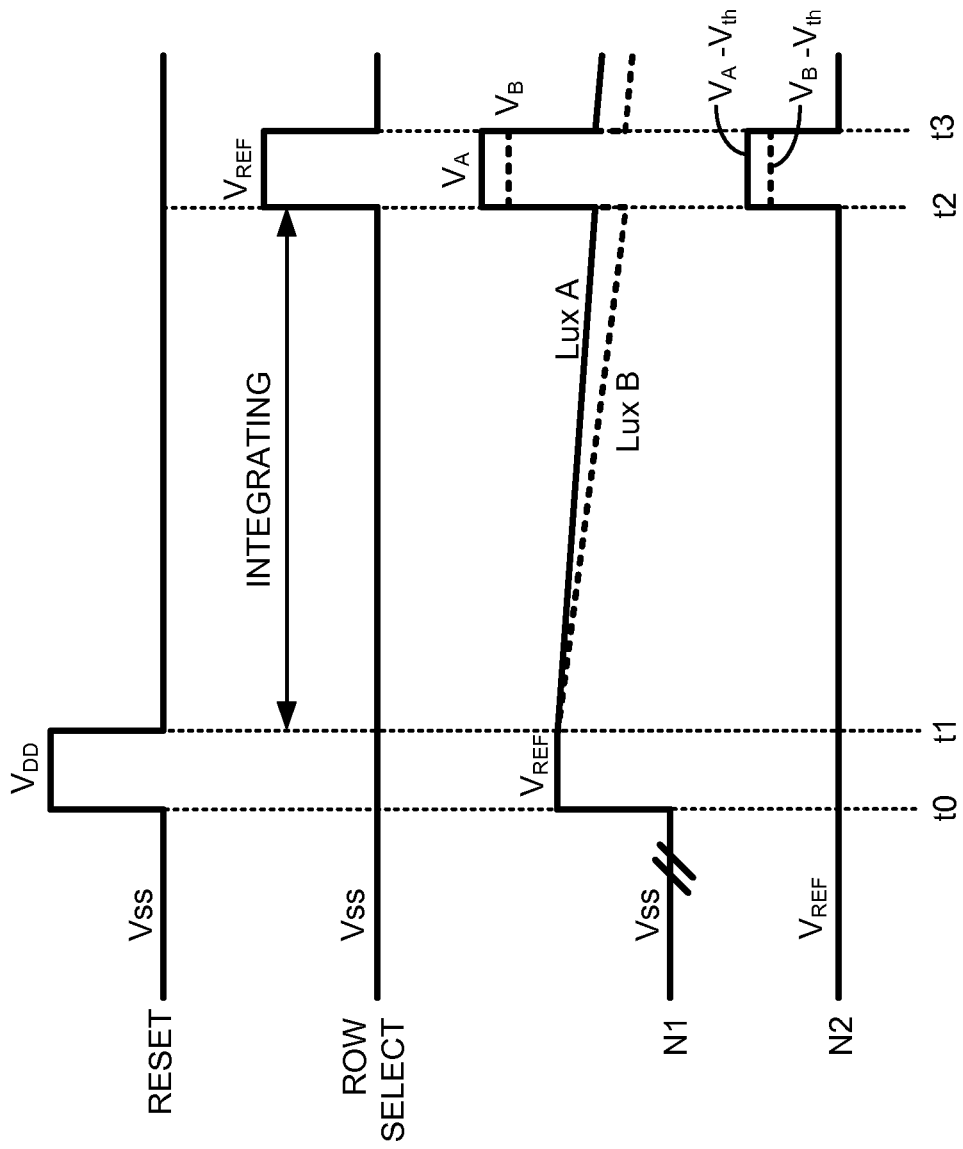
FIG. 2 shows a timing diagram corresponding to the operation of an active pixel sensor circuit according to embodiments of the present invention.

FIG. 2 shows a timing diagram corresponding to the operation of the active pixel sensor circuit 100. In the exemplary embodiment, the reset signal RESET is configured to have a pulse with a pulse width (t1−t0), a low voltage, $V_{SS}$, and a high voltage, $V_{DD}$, which is same as the second supply voltage $V_{DD}$ applied to the drain 136 of the readout transistor 130. The row select signal ROW SELECT is configured to have a pulse with a pulse width (t3−t2), a low voltage, $V_{SS}$, and a high voltage, $V_{REF}$, which is same as the first supply voltage $V_{REF}$ applied to the drain 126 of the reset transistor 120. The reset signal RESET and the row select signal ROW SELECT are synchronized such that the pulse of the row select signal ROW SELECT is shifted from the pulse of the reset signal RESET by a time period of T=(t2−t0).

In operation, the active pixel sensor circuit 100 experiences three stages: a reset stage, an integration stage and a readout stage.

At the beginning of the operation, the reset signal RESET is in the low voltage $V_{SS}$, the reset transistor 120 is turned off, and the potential of the node N1 is in floating. When the reset signal RESET transits from the low voltage $V_{SS}$ to the high voltage $V_{DD}$ at time t0, the reset transistor 120 is turned on accordingly, the first supply voltage $V_{REF}$ is applied to the cathode 142 of the photodiode 140, and the active pixel sensor circuit 100 operates in the reset stage for a time period of (t1–t0), where the reset signal RESET in the high voltage $V_{DD}$.

When the reset signal RESET transits from the high voltage $V_{DD}$ to the low voltage $V_{SS}$ at time t1, the reset transistor 120 is turned off. Accordingly, the cathode 144 and the anode 142 of the photodiode 140 have a voltage difference, ($V_{REF}-V_{SS}$), which also is the voltage difference between the second terminal 154 and the first terminal 152 of the integral capacitor 150. The photodiode 140 has a reversed bias voltage, i.e., the voltage potential in the cathode 144 is higher than that in the anode 142. At this time, the voltage potential of the node N1 is in floating. The active pixel sensor circuit 100 starts operating in the integration stage.

When the active pixel sensor circuit 100 operates in the integration stage, the voltage potential of the node N1 varies with the intensity of the light illuminating the photodiode 140. In response to the illumination of the light, the photodiode 140 generates photocharges. The generated photocharges recombine with the charges in the integral capacitor 150, which reduces the voltage difference between the second terminal 154 and the first terminal 152 of the integral capacitor 150. Accordingly, the voltage potential at the node N1 decreases as time goes in the integration stage of the time period of (t2–t1). The stronger the illumination of the light is, the larger the slope of the decrease of the voltage potential at the node N1 is. For example, as shown in FIG. 2, the slope of the voltage potential N1 for the light with an intensity Lux B, represented by the dash line, is larger than that for the light with an intensity Lux A, where Lux A<Lux B.

In the integration stage of the time period of (t2–t1), the reset transistor 120 is turned off, and the voltage potential of the node N1 is in floating. When the row select signal ROW SELECT transits from the low voltage $V_{SS}$ to the high voltage $V_{REF}$ at time t2, the voltage potential of the node N1 is boosted, through the integral capacitor 150, to ($V_{REF}-V_{SS}$), which is high enough to turn on the readout transistor 130.

When the voltage potential of the node N1 is boosted, due to the integral capacitor 150, to ($V_{REF}-V_{SS}$), the readout transistor 130 of the source follower is turned on.

When the readout transistor 130 of the source follower is turned on, the node N2 connected to the source 134 of the readout transistor 130 will output a voltage, ($V_A-V_{th}$), to the column output line 199 for readout. $V_A$ is a voltage of the node N2 after the node N1 is boosted for the illumination of the light with an intensity Lux A. Accordingly, the active pixel sensor circuit 100 operates in the readout stage in the time period of (t3–t2), where the row select signal ROW SELECT is in the high voltage $V_{REF}$.

In the active pixel sensor circuit 100 shown in FIG. 1, the source follower includes the readout transistor 130 and the current source 170.

Figure 3:
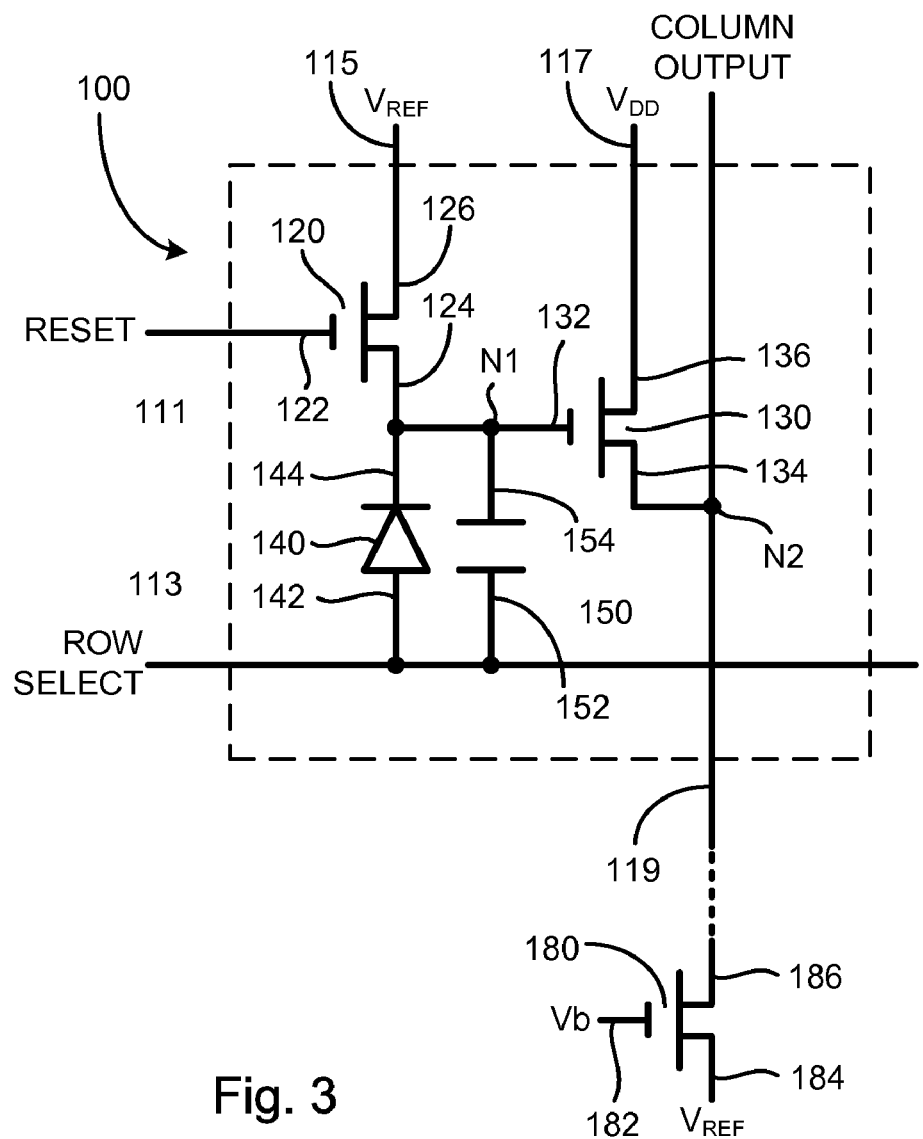
FIG. 3 shows an active pixel sensor circuit according to another embodiment of the present invention.

The source follower can also be formed with the readout transistor 130 and other components. For example, the source follower can include with the readout transistor 130 and an N-channel MOS transistor 180 having a gate 182 configured to receive a control signal, Vb, a source 184 configured to receive the first supply voltage $V_{REF}$ and a drain 186 electrically coupled to the column readout line, as shown in FIG. 3. The operation of the active pixel sensor circuit 100 as shown in FIG. 3 is same as that of the active pixel sensor circuit shown in FIG. 1.

Figure 4:
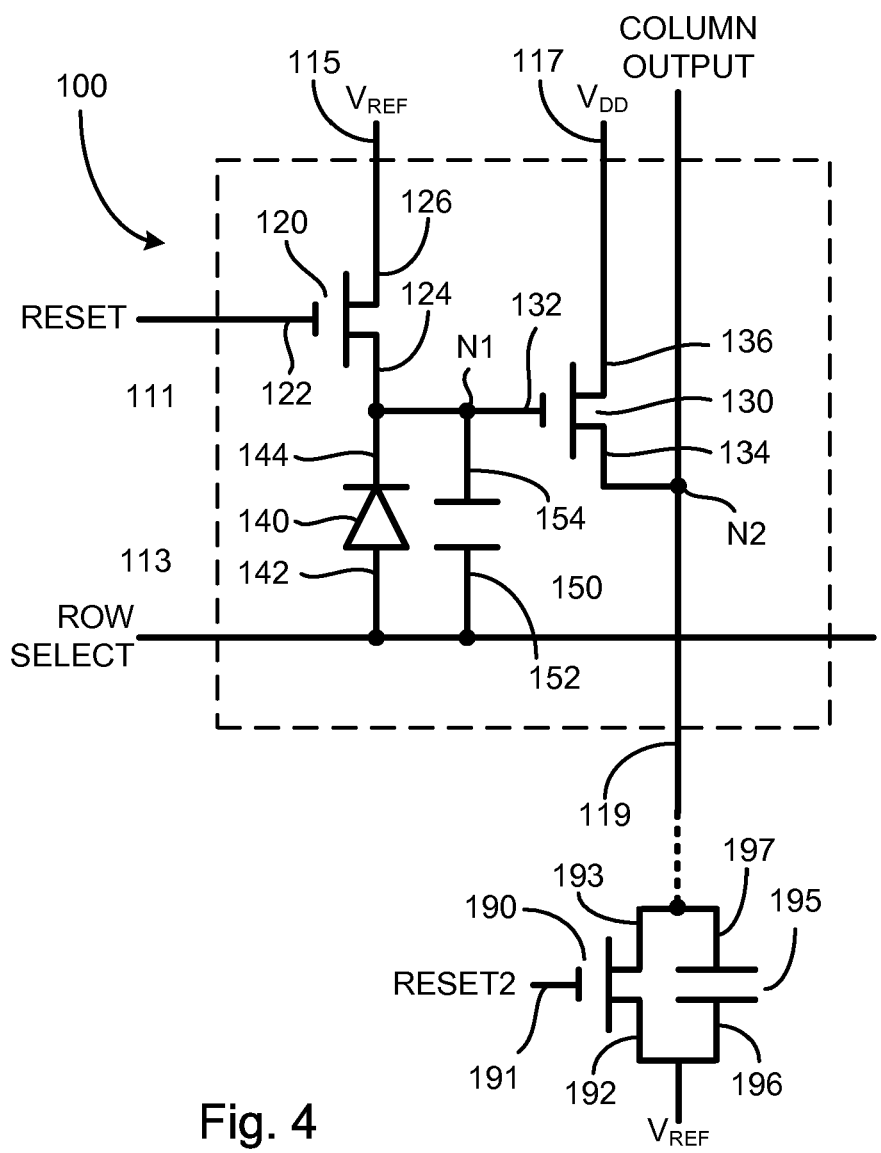
FIG. 4 shows an active pixel sensor circuit according to yet another embodiment of the present invention.
Figure 5:
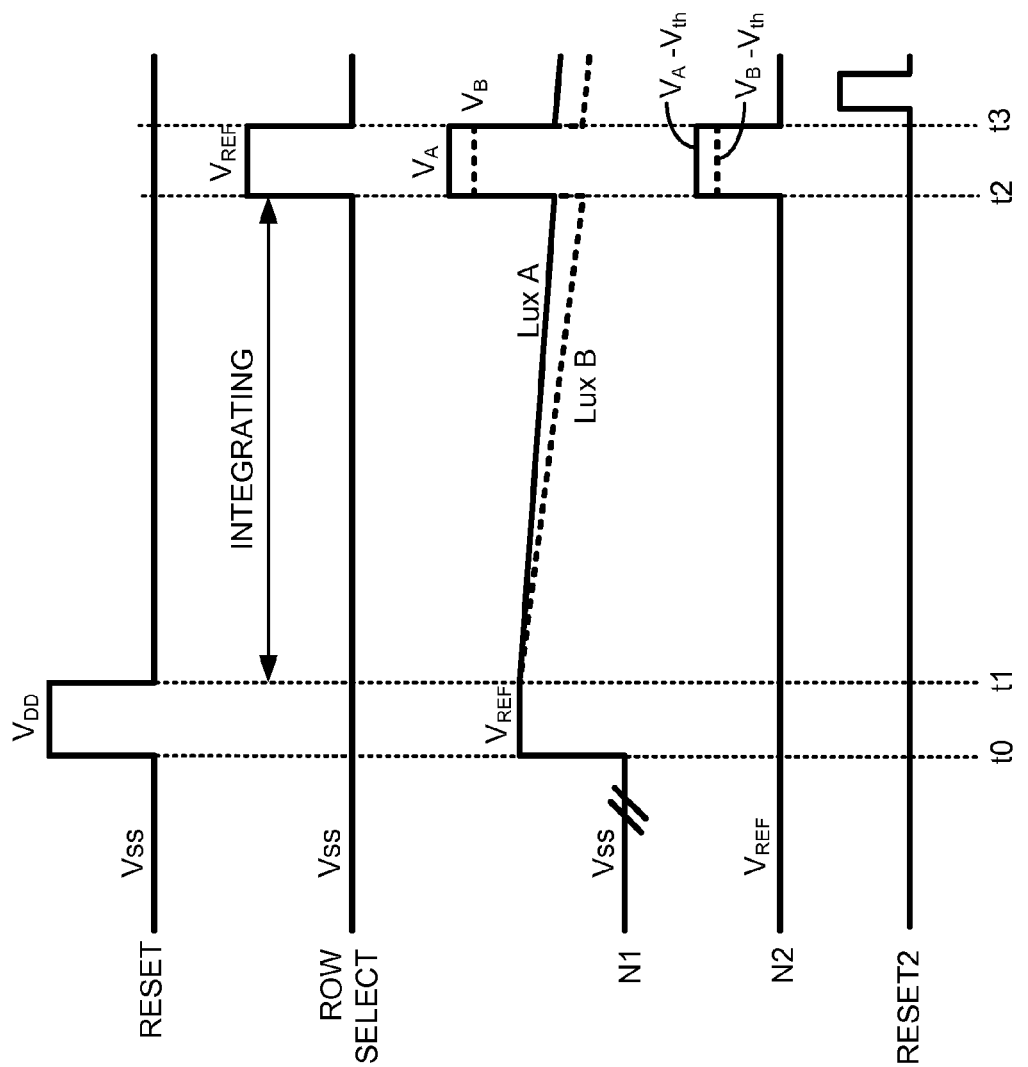
FIG. 5 shows a timing diagram corresponding to the operation of the active pixel sensor circuit as shown in FIG. 4.

FIG. 4 shows another embodiment of the active pixel sensor circuit, where the source follower includes the readout transistor 130, an N-channel MOS transistor 190 having a gate 191 configured to receive a control signal, RESET2, a source 192 configured to receive the first supply voltage $V_{REF}$ and a drain 193 electrically coupled to the column readout line 119, and a capacitor 195 having a first terminal 196 and a second terminal 197 electrically coupled to the source 182 and the drain 193 of the N-channel MOS transistor 190, respectively. The operation of the active pixel sensor circuit is same as that of the active pixel sensor circuit shown in FIG. 1. In addition, in order to correctly readout photovoltaic signals for the next row, the control signal RESET2 is configured to have a positive pulse, which is applied to the gate 191 of the transistor 190 shortly after the readout stage to clean up the voltage of the column readout line 119. The timing diagram corresponding to the operation of the active pixel sensor circuit is shown in FIG. 5.

Figure 6:
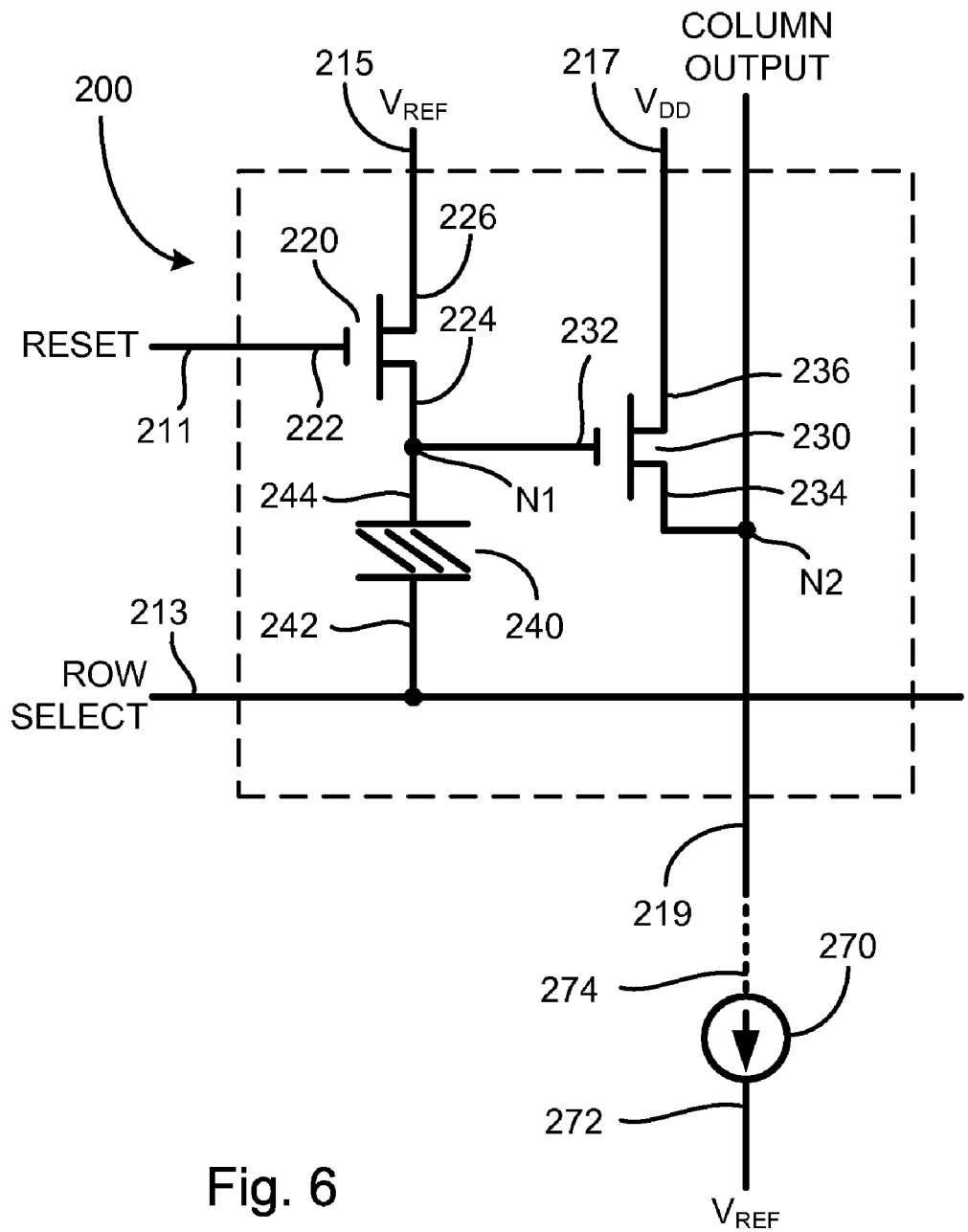
FIG. 6 shows an active pixel sensor circuit according to one embodiment of the present invention.

FIG. 6 shows an active pixel sensor circuit 200 according to one embodiment of the present invention. In this embodiment, the active pixel sensor circuit 200 includes a reset transistor 220 having a gate 222, a source 224 and a drain 226, a silicon rich oxide (SRO) photosensor 240 having an anode 242 and a cathode 244 electrically coupled to the source 222 of the reset transistor 220, at a node, N1, and a readout transistor 230 having a gate 232 electrically coupled to the cathode 244 of the SRO photosensor 240, a source 234 and a drain 236. The SRO photosensor 240 is adapted for generating charges (photovoltaic signal) in response to the illumination of light. Each of the reset transistor 220 and the readout transistor 230 is an N-channel MOS thin film transistor. Other types of transistors can also be utilized to practice the present invention.

The active pixel sensor circuit 200 also includes a reset line 211 electrically coupled to the gate 222 of the reset transistor 220 for providing a reset signal, RESET, a row select line 113 electrically coupled to the anode 242 of the SRO photosensor 240 for providing a row select signal, ROW SELECT, a first supply voltage line 215 electrically coupled to the drain 226 of the reset transistor 220 for providing a first supply voltage, $V_{REF}$, a second supply voltage line 217 electrically coupled to the drain 236 of the readout transistor 230 for providing a second supply voltage, $V_{DD}$, and a column readout line 219 electrically coupled to the source 234 of the readout transistor 230, at a node, N2, for outputting a photovoltaic signal generated by the SRO photosensor 240 in response to illumination of light.

Additionally, the active pixel sensor circuit 200 includes a bias current source 270 having a first terminal 272 configured to receive the first supply voltage $V_{REF}$ and a second terminal 274 electrically coupled to the column output line 219. A source follower, which includes the readout transistor 230 and the current source 270, is adapted for amplifying the charges (photovoltaic signal) generated by the SRO photosensor 240 in response to the illumination of light. The amplified photovoltaic signal is readout from the column output line 219 through the node N2, which is extended to an external circuit.

The operation of the active pixel sensor circuit 200 includes the steps of applying a first supply voltage, $V_{REF}$, and a second supply voltage, $V_{DD}$, to the drain 226 of the reset transistor 220 and the drain 236 of the readout transistor 230, respectively, and applying a reset signal, RESET, and a row select signal, ROW SELECT, to the gate 222 of the reset transistor 220 and the anode 242 of the SRO photosensor 240, respectively, and reading out a signal from the source 234 of the readout transistor 230 during a readout period. The signal is corresponding to the charges generated by the photodiode in response to illumination of light.

Referring back to FIG. 2, the timing diagram corresponding to the operation of the active pixel sensor circuit 200 is shown. In this exemplary embodiment, the reset signal RESET is configured to have a pulse with a pulse width (t1−t0), a low voltage, $V_{SS}$, and a high voltage, $V_{DD}$, which is same as the second supply voltage $V_{DD}$ applied to the drain 236 of the readout transistor 230. The row select signal ROW SELECT is configured to have a pulse with a pulse width (t3−t2), a low voltage, $V_{SS}$, and a high voltage, $V_{REF}$, which is same as the first supply voltage $V_{REF}$ applied to the drain 226 of the reset transistor 220. The reset signal RESET and the row select signal ROW SELECT are synchronized such that the pulse of the row select signal ROW SELECT is shifted from the pulse of the reset signal RESET by a time period of T=(t2−t0).

In operation, the active pixel sensor circuit 200 experiences three stages: a reset stage, an integration stage and a readout stage.

At the beginning of the operation, the reset signal RESET is in the low voltage $V_{SS}$, the reset transistor 220 is turned off, and the potential of the node N1 is in floating. When the reset signal RESET transits from the low voltage $V_{SS}$ to the high voltage $V_{DD}$ at time t0, the reset transistor 220 is turned on accordingly, the first supply voltage $V_{REF}$ is applied to the cathode 242 of the SRO photosensor 240, and the active pixel sensor circuit 200 operates in the reset stage for a time period of (t1−t0), where the reset signal RESET is in the high voltage $V_{DD}$.

When the reset signal RESET transits from the high voltage $V_{DD}$ to the low voltage $V_{SS}$ at time t1, the reset transistor 220 is turned off. Accordingly, the cathode 244 and the anode 242 of the SRO photosensor 240 have a voltage difference, ($V_{REF}-V_{SS}$). The SRO photosensor 240 has a reversed bias voltage, i.e., the voltage potential in the cathode 244 is higher than that in the anode 242. At this time, the voltage potential of the node N1 is in floating. The active pixel sensor circuit 200 starts operating in the integration stage.

When the active pixel sensor circuit 200 operates in the integration stage, the voltage potential of the node N1 varies with the intensity of the light illuminating the SRO photosensor 240. In response to the illumination of the light, the SRO photosensor 240 generates photocharges. The generated photocharges reduces the voltage difference between the cathode 244 and the anode 242 of the SRO photosensor 240. Accordingly, the voltage potential at the node N1 decreases as time goes in the integration stage of the time period of (t2−t1). The stronger the illumination of the light is, the larger the slope of the decrease of the voltage potential at the node N1 is. For example, as shown in FIG. 2, the slope of the voltage potential N1 for the light with an intensity Lux B, represented by the dash line, is larger than that for the light with an intensity Lux A, where Lux A<Lux B.

In the integration stage of the time period of (t2−t1), the reset transistor 220 is turned off, and the voltage potential of the node N1 is in floating. When the row select signal ROW SELECT transits from the low voltage $V_{SS}$ to the high voltage $V_{REF}$ at time t2, the voltage potential of the node N1 is boosted, due to the capacitance of the SRO photosensor 240, to ($V_{REF}-V_{SS}$), which is high enough to turn on the readout transistor 230.

When the voltage potential of the node N1 is boosted, due to the capacitance of the SRO photosensor 240, to ($V_{REF}-V_{SS}$), the readout transistor 230 of the source follower is turned on.

When the readout transistor 230 of the source follower is turned on, the node N2 connected to the source 234 of the readout transistor 230 will output a voltage, ($V_A-V_{th}$), to the column output line 299 for readout. $V_A$ is a voltage of the node N2 after the node N1 is boosted for the illumination of the light with an intensity Lux A. Accordingly, the active pixel sensor circuit 200 operates in the readout stage in the time period of (t3−t2), where the row select signal ROW SELECT is in the high voltage $V_{REF}$.

In the active pixel sensor circuit 200 shown in FIG. 6, the source follower has the readout transistor 230 and the current source 270.

Figure 7:
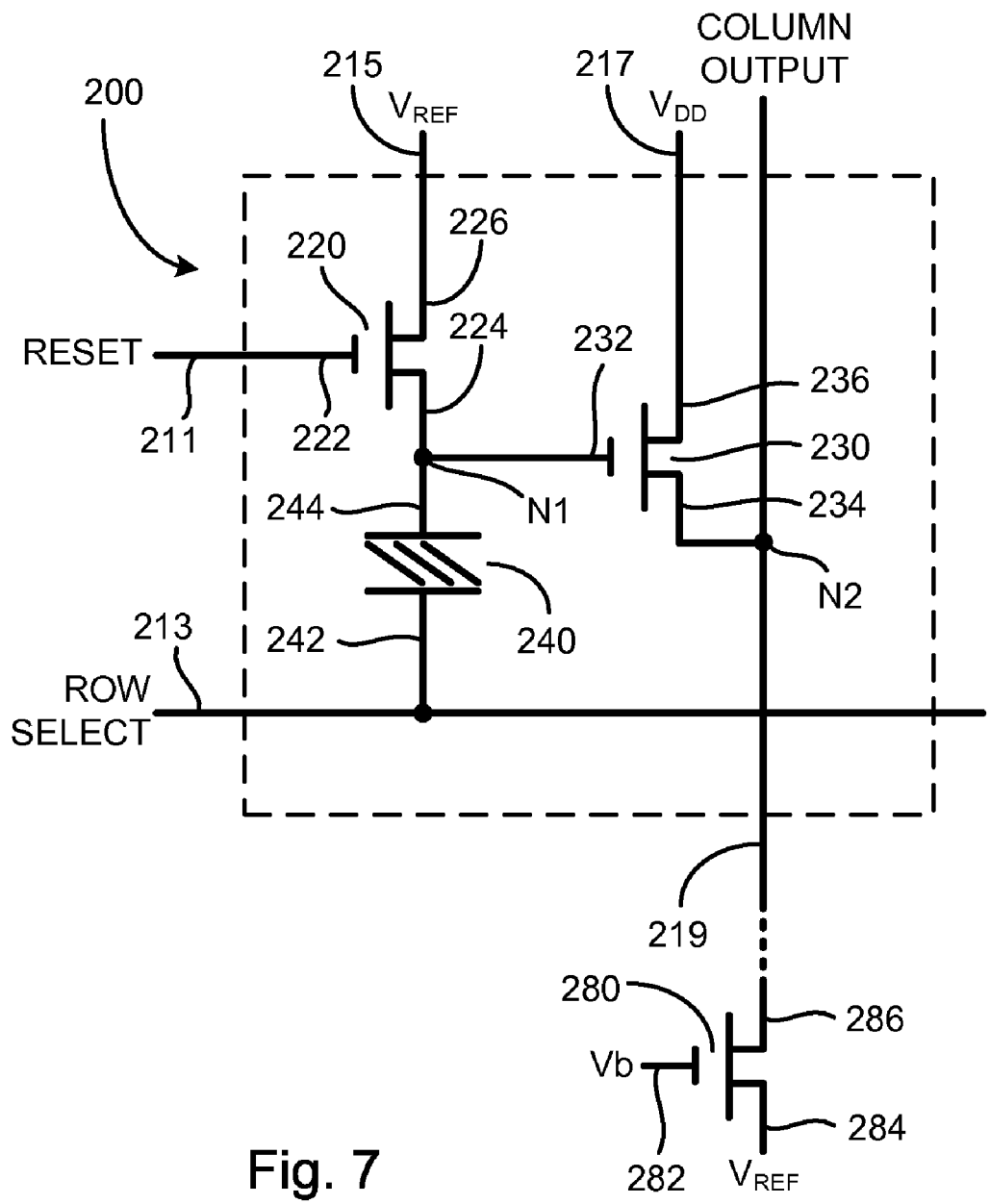
FIG. 7 shows an active pixel sensor circuit according to another embodiment of the present invention.

The source follower can also be formed with the readout transistor 230 and other components. For example, the source follower includes the readout transistor 230 and an N-channel MOS transistor 280 having a gate 282 configured to receive a control signal, Vb, a source 284 configured to receive the first supply voltage $V_{REF}$ and a drain 286 electrically coupled to the column readout line, as shown in FIG. 7. The operation of the active pixel sensor circuit 200 in FIG. 7 is same as that of the active pixel sensor circuit shown in FIG. 6.

Figure 8:
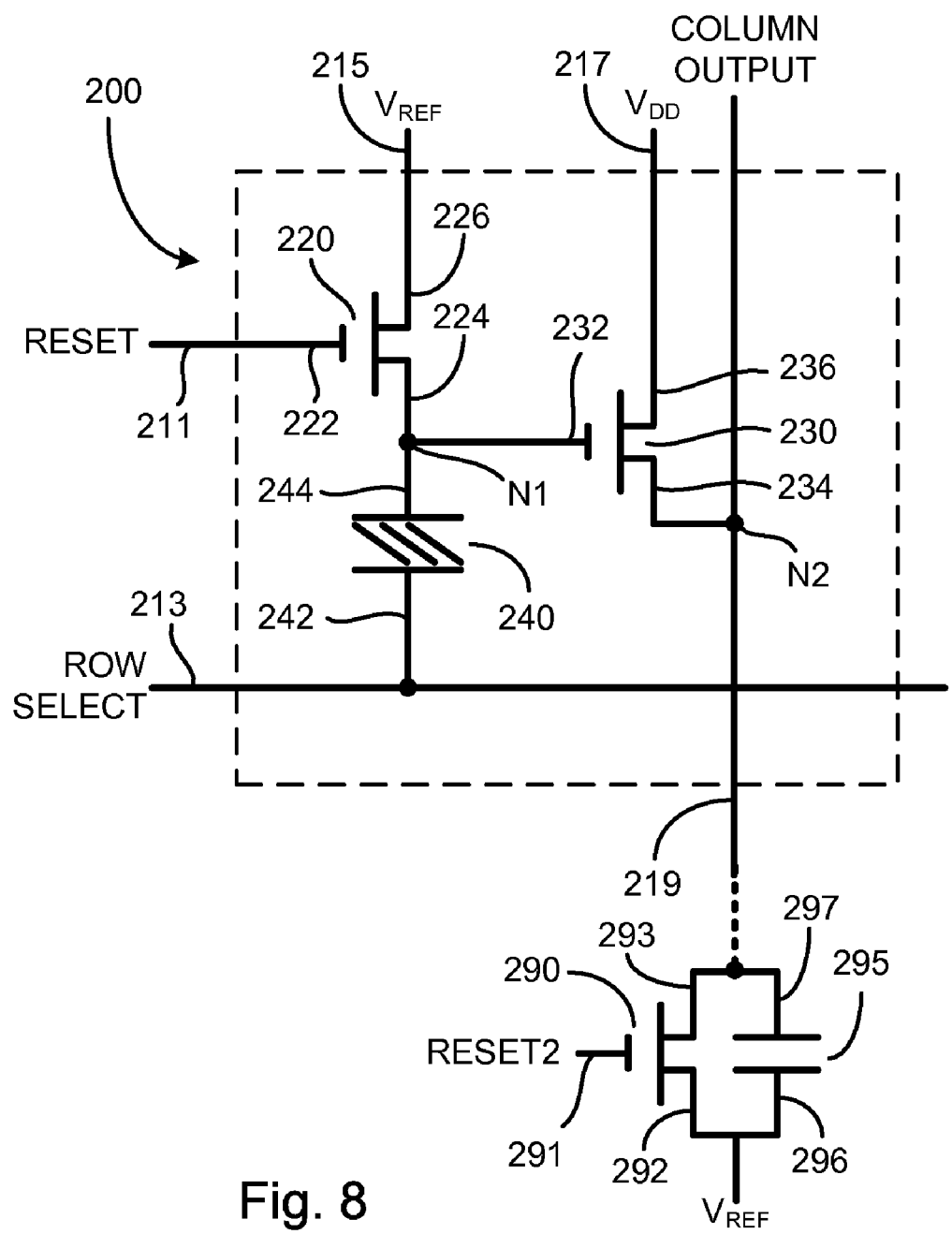
FIG. 8 shows an active pixel sensor circuit according to yet another embodiment of the present invention.

FIG. 8 shows another embodiment of the active pixel sensor circuit, where the source follower includes the readout transistor 230, an N-channel MOS transistor 290 having a gate 291 configured to receive a control signal, RESET2, a source 292 configured to receive the first supply voltage $V_{REF}$ and a drain 293 electrically coupled to the column readout line 219, and a capacitor 295 having a first terminal 296 and a second terminal 297 electrically coupled to the source 282 and the drain 293 of the N-channel MOS transistor 290, respectively. The operation of the active pixel sensor circuit is same as that of the active pixel sensor circuit shown in FIG. 5. In addition, in order to correctly readout photovoltaic signals for the next row, the control signal RESET2 is configured to have a positive pulse, which is applied to the gate 291 of the transistor 290 shortly after the readout stage to clean up the voltage of the column output line 219. The timing diagram corresponding to the operation of the active pixel sensor circuit is shown in FIG. 5.

Figure 9:
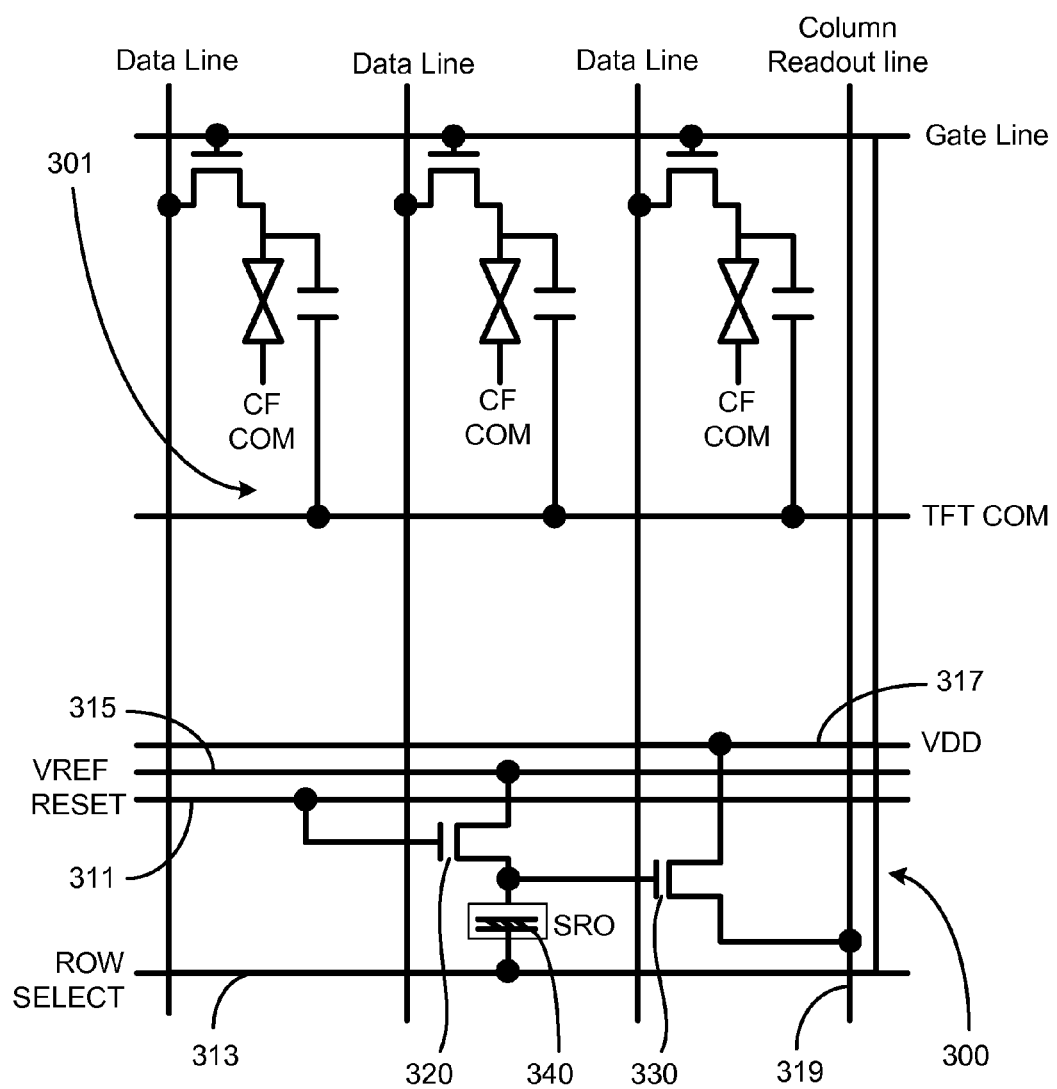
FIG. 9 shows schematically a display panel having active pixel sensor circuits according to one embodiment of the present invention.
Figure 10:
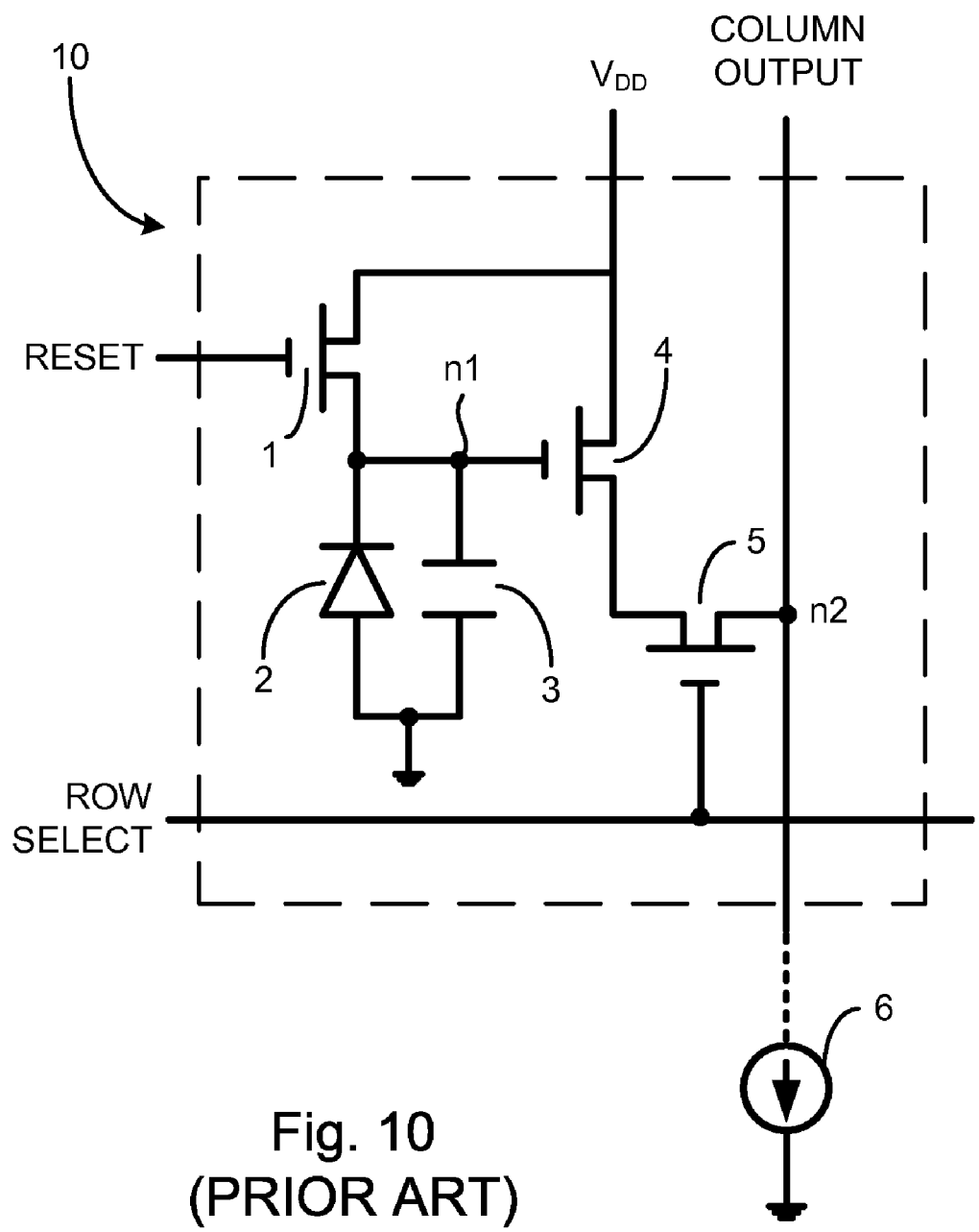
FIG. 10 shows a conventionally active pixel sensor circuit.

Referring to FIG. 9, a display panel having active pixel sensor circuits is shown according to one embodiment of the present invention. The display panel includes a plurality of pixels arranged in the form of matrix. Each pixel has an active pixel sensor circuit 300. In FIG. 9, only one pixel 301 is shown. The active pixel sensor circuit 300 includes a reset line 311 for providing a reset signal, RESET, a row select line 313 for providing a row select signal, ROW SELECT, a first supply voltage line 315 for providing a first supply voltage, $V_{REF}$, a second supply voltage line 317 for providing a second supply voltage, $V_{DD}$ and a column readout line 319 for outputting a photovoltaic signal. The active pixel sensor circuit 300 also includes a reset transistor 320 having a gate electrically coupled to the reset line 311, a source and a drain electrically coupled to the first supply voltage line 315, an SRO photosensor 340 having an anode electrically coupled to the row select line 313 and a cathode electrically coupled to the source 324 of the reset transistor 320, and a readout transistor 330 having a gate electrically coupled to the anode of the SRO photosensor 340, a source electrically coupled to the column output line 319, and a drain electrically coupled to the second supply voltage line 317.

When the SRO photosensor 340 is illuminated by light, such as backlight and/or ambient light, photocharges will be generated. The generated photocharges can be readout through the column readout line 319 that is extended to an external circuit.

The present invention, among other things, discloses an active pixel sensor circuit and a method of operating same. In one embodiment, the active pixel sensor circuit includes a reset transistor, a readout transistor and an SRO photosensor. The SRO photosensor not only has capacitance, but can be used to increase the boosting level so that to switch on the source follower. According to the present invention, the aperture ratio and sensitivity of a display can be improved.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An active pixel sensor circuit, comprising:
   (a) a reset line for providing a reset signal, RESET;
   (b) a row select line for providing a row select signal, ROW SELECT;
   (c) a first supply voltage line for providing a first supply voltage, $V_{REF}$;
   (d) a second supply voltage line for providing a second supply voltage, $V_{DD}$;
   (e) a column readout line for outputting a photovoltaic signal;
   (f) a reset transistor having a gate electrically coupled to the reset line, a source and a drain electrically coupled to the first supply voltage line;
   (g) a photodiode having an anode electrically coupled to the row select line and a cathode electrically coupled to the source of the reset transistor;
   (h) an integral capacitor having a first terminal electrically coupled to the row select line and a second terminal electrically coupled to a node, N1, that is electrically coupled to the source of the reset transistor; and
   (i) a readout transistor having a gate electrically coupled to the node N1, a source electrically coupled to the column readout line at a node, N2, and a drain electrically coupled to the second supply voltage line,
   wherein each of the reset signal RESET and the row select signal ROW SELECT is configured to have a pulse with a low voltage and a high voltage, and the pulse of the row select signal ROW SELECT is shifted from the pulse of the reset signal RESET by a time period.

2. The active pixel sensor circuit of claim 1, wherein each of the reset transistor and the readout transistor is an N-channel MOS thin film transistor.

3. The active pixel sensor circuit of claim 1, further comprising a bias current source having a first terminal configured to receive the first supply voltage $V_{REF}$ and a second terminal electrically coupled to the column readout line.

4. The active pixel sensor circuit of claim 1, further comprising an N-channel MOS transistor having a gate configured to receive a control signal, Vb, a source configured to receive the first supply voltage $V_{REF}$ and a drain electrically coupled to the column readout line.

5. The active pixel sensor circuit of claim 1, further comprising:
   (a) an N-channel MOS transistor having a gate configured to receive a control signal, RESET2, a source configured to receive the first supply voltage $V_{REF}$ and a drain electrically coupled to the column readout line; and
   (b) a capacitor having a first terminal and a second terminal electrically coupled to the source and the drain of the N-channel MOS transistor, respectively.

6. An active pixel sensor circuit, comprising:
   (a) a reset transistor having a gate, a source and a drain;
   (b) a photodiode having an anode and a cathode electrically coupled to the source of the reset transistor;
   (c) an integral capacitor having a first terminal and a second terminal electrically coupled to a node, N1, that is electrically coupled to the source of the reset transistor;
   (d) a readout transistor having a gate electrically coupled to the node N1, a source, and a drain;
   (e) a reset line electrically coupled to the gate of the reset transistor for providing a reset signal, RESET;
   (f) a row select line electrically coupled to both the anode of the photodiode and the first terminal of the integral capacitor for providing a row select signal, ROW SELECT;
   (g) a first supply voltage line electrically coupled to the drain of the reset transistor for providing a first supply voltage, $V_{REF}$;
   (h) a second supply voltage line electrically coupled to the drain of the readout transistor for providing a second supply voltage, $V_{DD}$; and
   (i) a column readout line electrically coupled to the source of the readout transistor for outputting a photovoltaic signal generated by the photodiode in response to illumination of light,
   (j) an N-channel MOS transistor having a gate configured to receive a control signal, RESET2, a source configured to receive the first supply voltage $V_{REF}$ and a drain electrically coupled to the column readout line; and
   (k) a capacitor having a first terminal and a second terminal electrically coupled to the source and the drain of the N-channel MOS transistor, respectively.

7. The active pixel sensor circuit of claim 6, wherein each of the reset signal RESET and the row select signal ROW SELECT is configured to have a pulse with a low voltage and a high voltage, and the pulse of the row select signal ROW SELECT is shifted from the pulse of the reset signal RESET by a time period.

8. A method of operating the active pixel sensor circuit comprising:
   (i) a reset transistor having a gate, a source and a drain;
   (ii) a photodiode having an anode and a cathode electrically coupled to the source of the reset transistor;
   (iii) an integral capacitor having a first terminal and a second terminal electrically coupled to a node, N1, that is electrically coupled to the source of the reset transistor; and
   (iv) a readout transistor having a gate electrically coupled to the node N1, a source, and a drain,
   the method comprising the steps of:
   (a) applying a first supply voltage, $V_{REF}$, and a second supply voltage, $V_{DD}$, to the drain of the reset transistor and the drain of the readout transistor, respectively;
   (b) applying a reset signal, RESET, and a row select signal, ROW SELECT, to the gate of the reset transistor and the anode of the photodiode, respectively, wherein each of the reset signal RESET and the row select signal ROW SELECT is configured to have a pulse with a low voltage and a high voltage, and the pulse of the row select signal ROW SELECT is shifted from the pulse of the reset signal RESET by a time period of T; and (c) reading out a signal from the source of the readout transistor during a readout stage, the signal corresponding to photocharges generated by the photodiode in response to illumination of light.

9. The method of claim 8, wherein the readout stage is corresponding to a period of time in which the row select signal ROW SELECT is in the high voltage.

10. An active pixel sensor circuit, comprising:
(a) a reset transistor having a gate, a source and a drain;
(b) a silicon rich oxide (SRO) photosensor having an anode and a cathode electrically coupled to the source of the reset transistor; and
(c) a readout transistor having a gate electrically coupled to the cathode of the SRO photosensor, a source and a drain.
(d) a reset line electrically coupled to the gate of the reset transistor for providing a reset signal, RESET;
(e) a row select line electrically coupled to the anode of the SRO photosensor for providing a row select signal, ROW SELECT;
(f) a first supply voltage line electrically coupled to the drain of the reset transistor for providing a first supply voltage, $V_{REF}$;
(g) a second supply voltage line electrically coupled to the drain of the readout transistor for providing a second supply voltage, $V_{DD}$; and
(h) a column readout line electrically coupled to the source of the readout transistor for outputting a photovoltaic signal generated by the SRO photosensor in response to illumination of light, wherein each of the reset signal RESET and the row select signal ROW SELECT is configured to have a pulse with a low voltage and a high voltage, and the pulse of the row select signal ROW SELECT is shifted from the pulse of the reset signal RESET by a time period.

11. The active pixel sensor circuit of claim 10, further comprising a bias current source having a first terminal configured to receive the first supply voltage $V_{REF}$ and a second terminal electrically coupled to the column readout line.

12. The active pixel sensor circuit of claim 10, further comprising an N-channel MOS transistor having a gate configured to receive a control signal, Vb, a source configured to receive the first supply voltage $V_{REF}$ and a drain electrically coupled to the column readout line.

13. The active pixel sensor circuit of claim 10, further comprising:
(a) an N-channel MOS transistor having a gate configured to receive a control signal, RESET2, a source configured to receive the first supply voltage $V_{REF}$ and a drain electrically coupled to the column readout line; and
(b) a capacitor having a first terminal and a second terminal electrically coupled to the source and the drain of the N-channel MOS transistor, respectively.

14. The active pixel sensor circuit of claim 10, wherein each of the reset transistor and the readout transistor is an N-channel MOS thin film transistor.

15. An active pixel sensor circuit, comprising:
(i) a reset transistor having a gate, a source and a drain;
(ii) a silicon rich oxide (SRO) photosensor having an anode and a cathode electrically coupled to the source of the reset transistor; and
(iii) a readout transistor having a gate electrically coupled to the cathode of the SRO photosensor, a source and a drain, the method comprising the steps of:
(a) applying a first supply voltage, $V_{REF}$, and a second supply voltage, $V_{DD}$, to the drain of the reset transistor and the drain of the readout transistor, respectively;
(b) applying a reset signal, RESET, and a row select signal, ROW SELECT, to the gate of the reset transistor and the anode of the SRO photosensor, respectively, wherein each of the reset signal RESET and the row select signal ROW SELECT is configured to have a pulse with a low voltage and a high voltage, and the pulse of the row select signal ROW SELECT is shifted from the pulse of the reset signal RESET by a time period of T; and
(c) reading out a signal from the source of the readout transistor during a readout stage, the signal corresponding to the photocharges generated by the SRO photosensor in response to illumination of light.

16. The method of claim 15, wherein the readout stage is corresponding to a period of time in which the row select signal ROW SELECT is in the high voltage.

* * * * *